July 23, 1968
L. JOFFE
3,393,724
FASTENERS WITH EXPANDABLE LOCKING MEANS
Filed Oct. 21, 1965
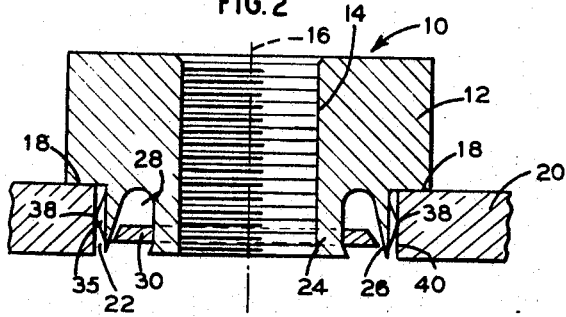
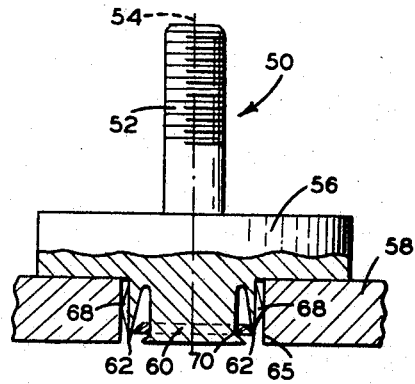
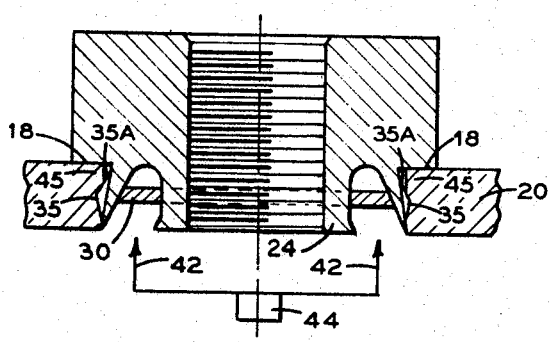
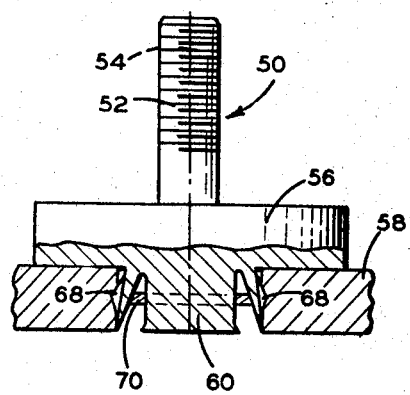
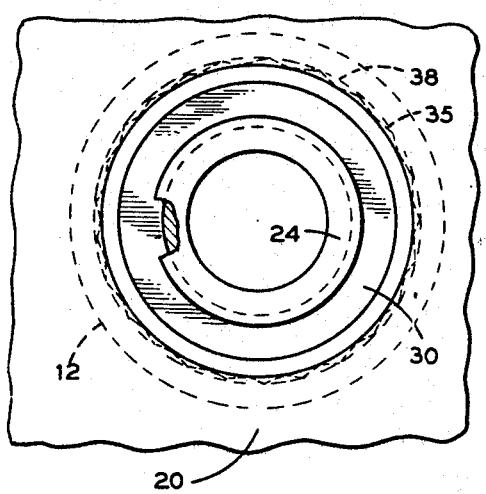
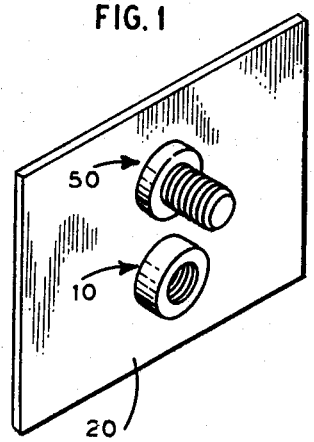
INVENTOR.
Leon Joffe
BY
ATTORNEY

United States Patent Office 3,393,724
Patented July 23, 1968

3,393,724
FASTENERS WITH EXPANDABLE LOCKING MEANS
Leon Joffe, 99 Leland Ave., New Rochelle, N.Y. 10805
Filed Oct. 21, 1965, Ser. No. 499,395
3 Claims. (Cl. 151—41.72)

ABSTRACT OF THE DISCLOSURE

This fastener is to be anchored in a hole in sheet of thin metal or equivalent. The fastener also embodies a border or annular shoulder to rest on the sheet around said hole. It also embodies a central piece that extends co-axially into the hole, and one or more depending tapered elements that support a knurl pointing into the peripheral surface of the hole. The knurl is supported at a level intermediate the top and bottom surfaces of the metal sheet. A wedge or tapered pressure ring is disposed between the central piece and the tapered elements, and, when pressed home, presses the knurl into the side wall of the hole and tightly grips the metal between the knurl and the shoulder.

---

This invention relates to fasteners, and particularly to anchoring fasteners, such as a nut or stud, which may be anchored on and secured to a base, to serve in turn as fastening and holding means for other objects and members to be secured to and anchored or mounted on such base.

The fasteners of the type described and disclosed herein, by way of example, are shown primarily as threaded nuts and studs, designed to be suitable for anchorage in a metal sheet or in other sheet material, to provide an anchor element to which external elements may be secured, to be mounted on the sheet base.

Where sheet material, such as sheet metal, is about one-sixteenth of an inch thick, the material is too thin to receive many threads to provide good mechanical anchorage for a threaded element, such as a nut or a stud, into which, or on which, other external elements may be mounted or supported.

In that type of threaded anchorage, the strength of the anchorage depends upon the threads, both in number and in dimension, and threads so formed represent a relatively weak part of the sheet metal structure.

The object of this invention is to provide a fastening element such as a nut or a stud, having a depending element which may be freely and easily inserted into a hole or opening in the sheet metal, and such depending element then expanded to be pressed into and to grip the surrounding wall at the periphery of the hole in such manner as to utilize the full strength of the sheet material to its maximum supporting effect.

Another object of the invention is to provide a fastening element, such as a nut or a stud, having an anchoring portion of such construction as to permit the fastening element, such as the nut or the stud, to be made with, and on, automatic machinery, and thereby at a relatively small cost, notwithstanding the advantageous features available in these fasteners.

Considering the threaded nut as one modification of the fastener, the nut body is provided with two coaxial extensions, one of which is an inner coaxial cylinder, relatively rugged, and the other of which is also coaxial but much thinner, and slightly radially displaced concentrically from the inner cylinder, and shaped to permit such outer cylinder to be distended at its lower or free end by a movable wedge provided in the form of a washer to be pressed upward in the space between the two concentric cylinders. The inner cylinder acts as a rigid bracing reaction member, and the outer cylinder acts as a substantially cantilever-type cylinder, whose outer or lower end may be readily radially distended by the wedge type washer provided between the two cylinders.

On the outer periphery of said outer cylinder is provided a knurled tooth-like projection, in the form of a co-axial annular ring with a triangular section whose tooth-like apex will be radially shifted when said wedge washer spreads the two cylinders. That tooth-like apex will dig into the encircling peripheral wall of the hole in which the nut is seated. The apex of that triangular tooth-like section when thus forced into the wall at the periphery of the seating hole for the nut, serves as a wedge tooth which digs into and forces the adjacent surrounding border material of the sheet material into a tightly gripped and locked position against the undersurface of the nut. The nut thus grips the peripheral border material at the hole as a pincer and is thus locked tightly in place on the sheet metal as a base. The strength of the entire sheet metal border surrounding the hole in which the nut is seated provides a full strength lock to hold the nut against displacement.

The stud to be used as a fastener, according to this invention, is also formed with a similar inner co-axial cylinder element and a concentric outer radially-spaced cylinder carrying the tooth-shaped element for gripping the sheet material onto which such stud is to be anchored.

In a variation of both the nut and the stud, the outer concentric cylindrical element may be slotted radially and lengthwise, to provide a plurality of curved cantilever tangs of arcuate section, each with a tooth section also of arcuate form, to be radially displaced to cause the tooth section to gouge into the wall of the sheet that is to support the nut or stud, and then be locked in such gouging position to lock the nut or stud against casual displacement.

The construction of the fasteners of this invention, and the manner in which they are manipulated to become assembled and anchored on a supporting base, are more fully shown in the accompanying drawings in which:

FIGURE 1 is a perspective view of a sheet or panel on which a threaded nut and a threaded stud are shown anchored to serve as supporting devices for an external body applied to either;

FIGURE 2 is a vertical section of a nut embodying this invention as seated in a hole in a supporting sheet on which the nut is to be anchored;

FIGURE 3 is a view similar to FIGURE 2 after the wedge action washer has been moved inwardly to lock the nut to the supporting sheet;

FIGURE 4 is a plan view of the bottom of the nut in FIGURE 2 after the nut has been anchored in position on the supporting sheet;

FIGURE 5 is the vertical elevational view of a stud according to this invention, that is to be anchored in the supporting sheet or equivalent structure;

FIGURE 6 is a side view in section showing the stud of FIGURE 5 slipped into an opening in a supporting sheet to which the stud is to be secured.

As shown in FIG. 1, either a nut 10 or a stud 50 may be mounted on a sheet 20 according to this invention.

As shown in FIGURE 2, a threaded nut 10 has a main body portion 12 that is co-axially threaded in a bore 14 around a central axis 16. The body 12 has an under surface as an annular shoulder 18 to seat against the front surface of a supporting sheet 20, which may be of metal or of any other desirable material, either insulating or non-insulating, according to the use to which the nut 10 is to be applied.

The location for the anchoring nut 10 is predetermined by locating a hole 22 in the supporting sheet 20. The axis of the hole will locate and be congruent with the axis 16 of the nut 10. The size of the hole will be just enough to accommodate and receive under elements of the nut 10, and to permit those under elements of the nut to be slipped readily into place in the hole without excessive pressure.

To provide for anchoring the nut 10 in its supporting sheet 20, the nut is provided with a first co-axial central or inner cylindrical extension 24 and a second or outer concentric cylindrical extension 26, the latter being radially displaced from the central coaxial extension 24 by a space 28 in which a wedging washer or movable driver ring 30 is disposed, for a purpose to be presently described. The outer cylindrical extension 26 is only one-fourth or one-fifth as thick as the inner cylindrical extension 24, and is slightly tapered downwardly and outwardly so that it can be distended radially outward, as a cantilever, by the pressure of the wedging washer or driver ring 30 when that washer is forced or pressed inwardly into the space 28 between the two cylindrical elements 24 and 26. The outer cylinder is essentially a cylindrical cantilever, anchored at one end and free at the other end.

In order to lock the nut 10 in position, a concentric ring or knurl 35 is provided on the outer cylindrical extension 26, formed as a circular ring, and is part of the outer peripheral surface of said outer cylindrical extension 26. The ring 35 is indicated as triangular in section, to emphasize the fact that the peripheral apex 38 of the ring knurl, as indicated, is utilized as a penetrating circular tooth to bite into the adjacent peripheral wall surface 40, defining and encircling the hole 42. The manner in which that action takes place will be apparent from consideration of FIGURES 2 and 3.

As shown in FIGURE 2, the nut 10 is slipped down into the hole 22, which is preferably of such diameter that the apex circle 38 of the wedge 35 will just engage the peripheral surface 40 around the hole 22. Any slight discrepancy in the relationship between those dimensions will not be serious. A loose fit, or a slip fit, or a slightly tight fit, will all be satisfactory.

Once the nut 10 has been fully seated on the sheet 20 to which it is to be attached, with the shoulder 18 resting on the top surface of the sheet 20, the wedging washer 30 is pressed inward by a suitable tool, such as pressure tongs, and the washer 30 will thereupon radially distend the outer cylindrical portion 26 about its base as a cantilever, to thereby force the tooth section 35 outward radially and to cause the apex line 38 of the tooth knurl or wedge 35 to bite into the adjacent wall 40 defining the hole 22 in the sheet 20.

As the washer 30 is pressed inwardly, or upwardly, as indicated by the pressure arrows 42 in FIGURE 3, by the pressure device 44, the wedging ring 35 is forced radially outward into the wall material of the sheet 20 around the hole, and becomes locked as a key in that wall material. In addition, the adjacent upper border material of the wall, as indicated in the adjacent region 45, becomes pressed upward against the shoulder 18 of the nut and that material of region 45 is wedged and locked against displacement. When the supporting sheet 20 is of aluminum, some of the wedged material in the region 45 may be squeezed and compressed sufficiently to be distorted to form an extension 20–a radially inward into the space 22–a between the bottom shoulder 18 of the nut and the top surface 35A of the knurl ring 35.

After the wedging washer 30 is thus forced to its innermost upper position to establish the extreme wedging action, the washer is held frictionally against displacement and serves to hold the wedging ring 35 in its radially displaced position, locked into the wall of the supporting sheet 20, as shown in FIG. 3.

The nut 10 is thus locked into, and secured to, the sheet 20, so that the nut will be held against displacement by any normal working force which it is intended to withstand.

In another modification of the nut, the cylindrical wedge ring 26, shown in FIGURES 2 and 3, may be radially slotted, to provide several arcuate sections each with its knurl section as part of its external or peripheral ring, so that the wedging washer 30 may be pressed into wedging position with slightly less pressure than needed to distend the complete and continuous cylindrical ring 26. That structure in shown in detail in connection with the stud shown in FIGURES 5 and 6.

In FIGURE 4 is shown a plan view of the bottom of the nut and illustrates how the cylindrical wedge ring 26 is radially distended so that its peripheral tooth wedge 35 extends into the wall of the supporting sheet 20, with the wedge apex deeply embedded in the sheet material.

In FIGURE 5 is shown a threaded stud 50 which may be employed as an achor element to which other devices may be fastened. The stud 50 comprises a threaded top shank 52, which may be cylindrical about a central axis 54, or it may have any other desired cross-section as needed for any particular application. The shank 52 is secured to an integral base pad or seating portion 56 to rest on a supporting sheet or plate 58, in which, and to which, the stud 50 is to be anchored, in a predetermined selected location, in a manner similar to that shown for anchoring the nut 10, as indicated in FIGURES 2 and 3, to such a similar supporting sheet 20.

The threaded stud 50 further comprises a central coaxial bottom shank extension 60, with laterally or radially spaced depending wedging elements 62. The wedging element 62 may be one annular ring around the central reaction shank 60, or each element 62 may be an individual portion of concentric encircling arrangement around the central shank 60.

The location of the stud 50 is predetermined by locating a hole 65 in the supporting plate 58, whose axis corresponds with the center line or axis line 54 of the stud 50. Hole 65 is made of sufficient diameter to accommodate and receive the wedging ring or wedging sections 62, each of which embodies an external knurl 68 to be forced into the side wall of the hole 65 in the plate 58. The ring sections 62 are forced to engage and bite into said side wall of the hole when the wedging washer 70 is moved upwardly on the depending shank 60 in order to press the cylinder sections 62 radially outward from the central axis 54.

After the wedging washer 70 is forced upwardly, the anchoring sections 62 are pressed outwardly to move the tooth-like wedges 68 to the positions shown in FIGURE 7, and are locked in such locking and anchoring positions by the wedging washer 70.

The various elements are shown in their generally preferred form and position. The dimensions and arrangement may be modified without departing from the spirit and scope of the invention as set forth in the appended claims. Thus, for example, the wedge ring 35 may be a continuous knurl or individual knurls may be formed, as shown dotted in FIG. 4.

What is claimed is:
1. A fastener to be anchored in a hole in a supporting plate having an exposed outer surface, said fastener comprising
 a main body having a border shoulder underseat to seat on such plate on a border area on said exposed outer surface around said hole;
 a central pressure reaction portion substantially cylindrical and depending co-axially from said main body to extend co-axially into the space of such hole in such plate;
 a tapered arm depending from said main body and separated radially from said reaction portion by an annular space, and said depending arm being substantially cylindrical and relatively tapered downwardly to minimum annular section from said main body;
 a wedging key supported on the radially outer side of said depending arm remote from said pressure reaction portion, said wedging key being shaped to em- body an outer anchoring tip disposed arcuately and transversely to the axis of said pressure reaction portion;

and a spreading member disposed in said annular space between said pressure reaction portion and said tapered depending arm, said spreading member being operative to displace the depending arm radially outwardly from said pressure reaction portion and to move said wedging key correspondingly radially outward, whereby said wedging key is pressed into such supporting plate at the surface defining the wall of the hole originally provided for receiving and accommodating the fastener, and the arcuate form of the tip into said wall and transverse to said axis provides effective pull-out resistance.

2. A fastener to be anchored in a wall, within a hole in said wall, said fastener comprising a main body to serve as a holding and securing member for an external device and having a portion with a bottom surface of greater diameter than the hole to seat as a shoulder on the wall on a border area beyond and around said hole;

means integral with said main body and disposed on said body for depending into such hole, said integral means including a relatively immovable pressure-reaction central co-axial shank having a cylindrical outer surface, and said integral means also having a relatively moveable centilever element having a supported end and a free end, and radially spaced from said immovable shank and longitudinally tapered from its supported end to its free end to permit lateral radial displacement of said free end;

a pointed anchoring tip integrally disposed on the cantilever element on the side remote from the pressure-reaction shank and facing the inner peripheral surface of the wall at the hole, said tip having an arcuate apex concentric about the axis of the reaction shank;

and means disposed between the shank and said cantilever element and movable therein to force the cantilever element farther away from the pressure-reaction shank, and thereby to laterally radially shift said pointed anchoring tip outwardly into an effective rooting and anchoring position in said wall, with said pointed tip acting as a pincer gripping the material of the wall between said pointed tip and then shoulder surface of said main body of said fastener.

3. A fastener to be inserted into a hole in a wall and then achored on said wall, said fastener comprising a main body element to serve as a support for an external body and having a portion with an under shoulder of sufficient width to extend beyond said hole and to seat on the border area adjacent and around said hole;

a rigid first auxiliary cylindrical element having a diameter less than said hole and depending from said main body co-axially into said hole;

a second auxiliary element supported and depending co-axially from said main body into said hole as a cantilever in the space between the first rigid auxiliary element and the wall of the hole, said element being substantially cylindrical and tapering conically downward from its region of support from said main body;

wedging means disposed between said first and second auxiliary elements and movable to displace said second auxiliary element towards the surface of said hole wall encircling and defining said hole, and to hold said second auxiliary element in such displaced position;

and tooth-like means supported on said second auxiliary element and shaped to have an arcuate ridge concentric about the axis of said first auxiliary cylindrical element, and operative to bite into the material at said surface of said hole when said second auxiliary element is so displaced toward said hole surface, and said tooth-like means then serving to remain as a locking key element in said material at the surface of said hole, thereby locking said fastener to said wall.

References Cited

UNITED STATES PATENTS

| | | | |
|---|---|---|---|
| 3,166,972 | 1/1965 | Rapata | 85—73 |
| 879,382 | 2/1908 | Harris | 29—432 |
| 1,716,144 | 6/1929 | Morrison | 151—41.72 |
| 2,415,695 | 2/1947 | Kann | 151—41.72 |
| 2,577,810 | 12/1951 | Rosan | 151—42 |
| 3,131,743 | 5/1964 | Hinkle | 151—41.73 |
| 3,252,493 | 5/1966 | Smith | 85—73 |

FOREIGN PATENTS

| | | |
|---|---|---|
| 806,650 | 12/1958 | Great Britain. |
| 886,010 | 1/1962 | Great Britain. |

MARION PARSONS, Jr., *Primary Examiner.*